United States Patent [19]
Mennemeier et al.

[11] Patent Number: 5,880,979
[45] Date of Patent: *Mar. 9, 1999

[54] SYSTEM FOR PROVIDING THE ABSOLUTE DIFFERENCE OF UNSIGNED VALUES

[75] Inventors: Larry M. Mennemeier, Boulder Creek, Calif.; Alexander D. Peleg; Koby Gottlieb, both of Haifa, Israel

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,742,529.

[21] Appl. No.: 576,469

[22] Filed: Dec. 21, 1995

[51] Int. Cl.$^6$ .............................. G06F 7/00; G06F 7/38
[52] U.S. Cl. ..................... 364/715.012; 364/749
[58] Field of Search ................ 364/715.01, 736, 364/749

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,635,292 | 1/1987 | Mori et al. | 382/41 |
| 4,707,800 | 11/1987 | Montrone et al. | 364/788 |
| 4,771,379 | 9/1988 | Ando et al. | 364/200 |
| 4,849,921 | 7/1989 | Yasumoto et al. | 364/715.01 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786 |
| 5,216,628 | 6/1993 | Mitzutani et al. | 364/715.012 |
| 5,305,249 | 4/1994 | Yoshida | 364/768 |
| 5,339,447 | 8/1994 | Balmer | 395/775 |
| 5,430,886 | 7/1995 | Furtek | 395/800 |
| 5,504,931 | 4/1996 | Furtek | 395/800 |
| 5,592,405 | 1/1997 | Gove et al. | 364/749 |

OTHER PUBLICATIONS

J. Shipnes, *Graphics Processing with the 88110 RISC Microprocessor*, IEEE (1992), pp. 169–174.

*MC88110 Second Generation RISC Microprocessor Users's Manual*, Motorola Inc. (1991).

*Errata to MC88110 Second Generation RISC Microprocessor Users's Manual*, Motorola Inc. (1992), pp. 1–11.

*MC88110 Programmer's Reference Guide*, Motorola Inc. (1992), p. 1–4.

i860™ *Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

(List continued on next page.)

*Primary Examiner*—Chuong Dinh Ngo
*Attorney, Agent, or Firm*—Blakely, Sokoloff, Taylor & Zafman LLP

[57] ABSTRACT

In a computer system storing a first packed data and a second packed data having corresponding data elements where the data elements representing unsigned values having a system for determining the absolute difference of the corresponding data elements. The system comprising the steps of subtracting with saturation the data elements in the first packed data from the corresponding data elements in the second packed data to generate a third packed data in response to a first instruction, subtracting with saturation the data elements in the second packed data from the corresponding data elements in the first packed data to generate a fourth packed data in response to a second instruction and performing an operation to select the data elements of the third packed data and the fourth packed data of greatest value to generate a fifth packed data in response to a third instruction.

15 Claims, 7 Drawing Sheets

OTHER PUBLICATIONS

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16, 17.

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, Digest of Technical Papers; IEEE International (1980).

B. Case, *Philips Hopes to Displace DSPs with VLIW,* Microprocessor Report (Dec. 94), pp. 12–18.

N. Margulis, *i860 Microprocessor Architecture,* McGraw Hill, Inc. (1990) Ch. 6, 7, 8, 10, 11.

*Pentium Processor User's Manual,* vol. 3: Architecture and Programming Manual, Intel Corporation (1993), Ch. 1,3,4, 6,8, and 18.

SYSTEM FOR PROVIDING THE ABSOLUTE DIFFERENCE OF UNSIGNED VALUES

CROSS-REFERENCE TO RELATED APPLICATION

Ser. No. 08/576,129, titled "A Method and Apparatus for Providing the Absolute Difference of unsigned values," filed Dec. 21, 1995 by Intel Corporation.

BACKGROUND OF THE INVENTION

1. Field of the Invention

The invention relates to the field of computer systems. More specifically, the invention relates to a system for providing the absolute difference of unsigned values.

2. Background Information

Multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 bits and sound data typically requires 16 bits. Each of these multimedia application requires one or more algorithms, each requiring a number of operations. For example, an algorithm may require an add, compare and shift operations.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data item and a second packed data item. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

In performing video conferencing in multimedia applications, video data from a camera is first encoded. The encoded data is then transmitted though a channel (a CD ROM, disk) to be processed by a decoder. The decoder then outputs frame information to be displayed. The encoding typically requires the step of performing a motion estimation. Motion estimation is the process of estimating displacement of the moving objects in a video sequence. Such estimation requires searching for the best matches between data sets of a given current frame and a given reference frame, where a current frame is what is displayed at the present and a reference frame is what needs to be displayed. The sum of absolute differences is commonly used for such estimation. The displacement information is used to interpolate missing frame data or to improve the performance of compression algorithms. The searching step is typically performed by using conventional scalar mechanism to calculate the sum of absolute differences. This is performed by subtracting each pixel value in the current frame from its corresponding pixel in the reference frame, taking the absolute value of the result. This may involve a branch operation and summing the results into an accumulator.

The conventional scalar mechanism of performing a search for matching data sets using branching operations leads to sacrificing processing speed by paying for branch prediction penalties. More specifically, some implementations for performing branching operations try to speed up execution by attempting to reduce pipeline penalties that can result from branches by speculatively predicting where branches will go with either compile-time schemes (e.g. predict-not-taken or predict-taken) or hardware schemes (e.g. branch-prediction buffer). If a prediction is correct, the proper instruction will have been fetched and decoded in advance and there is a potential for a gain in performance. However, if a prediction is wrong, performance is lost. For example, assume the prediction scheme has predicted that the branch will be taken in the above pseudo code representation and further assume that the branch condition is not actually met. By the time the branch condition is evaluated, the pipeline already contains the decoded STORE X,C instruction. Thus, when the branch condition is determined to be false, the correct instruction (the STORE X,B instruction) must be fetched and decoded, effectively causing the pipeline to stall. This example illustrates the uncertain nature of branches based on data. The inherent problem with this technique is that branches on data are poorly predicted by branch prediction schemes. As a result, branch prediction penalties are frequently paid in situations similar to the one illustrated above.

Thus, a limitation of this and other prior methods of performing searches for matching data in motion estimation using branching operations, is the high cost to performance due to mispredicted branches. The processing time required to perform such branching operation increases the overall processing time. Therefore, it is desirable to incorporate in a computer system a method and an apparatus for performing the searching step required in motion estimation without the need for branching and therefore without having to sacrifice processing speed.

SUMMARY

In a computer system with a processor coupled to a storage device storing a first packed data and a second packed data having corresponding data elements where the data elements representing unsigned values and determining the absolute difference of the corresponding data elements. The processor performs the steps of subtracting with saturation the data elements in the first packed data from the corresponding data elements in the second packed data to generate a third packed data in response to a first instruction, subtracting with saturation the data elements in the second packed data from the corresponding data elements in the first packed data to generate a fourth packed data in response to a second instruction and performing an operation to select the data elements of the third packed data and the fourth packed data of greatest value to generate a fifth packed data in response to a third instruction.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

According to one aspect of the invention, a system for calculating absolute differences of unsigned numbers for unsigned packed data is described. In one embodiment of the invention, packed subtractions are performed with unsigned saturating arithmetic. Unlike prior art systems, no branching operations are necessary.

Figure 1:
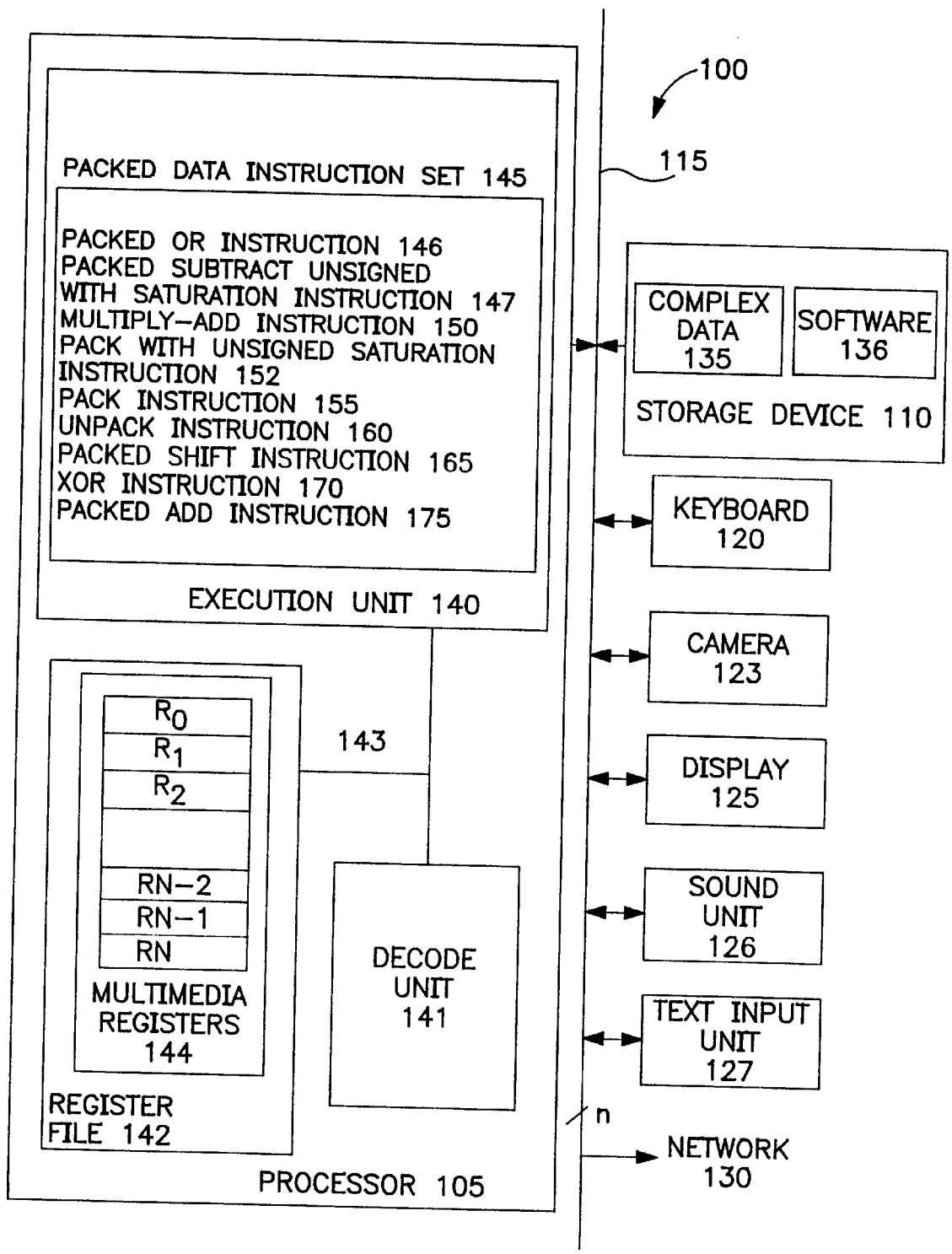
FIG. 1 shows a block diagram illustrating an exemplary computer system according to one embodiment of the invention.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120, a camera 123 and a display 125, are also coupled to the bus 115. A network 130 may also be coupled to bus 115. Additionally, a sound unit 126 such as a microphone and/or a speaker for input and output of sound and a text unit 127 such as a writing pad or a text scanner for input and output of text is coupled to bus 115. The processor 105 represents a central processing unit of any type of architecture, such as a CISC, RISC, VLIW, or hybrid architecture.

In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

FIG. 1 also illustrates that the storage device 110 has stored therein complex data 135 and software 136. Complex data 135 represents data stored in one or more of the formats described herein. Software 136 represents the necessary code for performing any and/or all of the techniques described with reference to FIGS. 3 through 7b. Of course, the storage device 110 preferably contains additional software (not shown), which is not necessary to understanding the invention.

FIG. 1 additionally illustrates that the processor 105 includes a decode unite 141, a set of registers 142 and 144, an execution unit 140 and internal bus 143 for executing instructions. The decode unit 141, registers 142 and execution unit 140 are coupled together by internal bus 143. The decode unit 141 is used for decoding instructions received by processor 105 into control signals and/or microcode entry points. In response to these control signals and/or microcode entry points, the execution unit 140 performs the appropriate operations. The decode unit 141 may be implemented using any number of different mechanisms (e.g., a look-up table, a hardware implementation, a PLA, etc.).

The execution unit 140 is shown including packed data instruction set 145 for performing operations on packed data. In one embodiment, the packed data instruction set 145 includes the following instructions: a packed or instruction 146, a packed subtract unsigned with saturation instruction 147, a packed multiply-add instruction 150, a pack with unsigned saturation instruction 152, a pack instruction 155, an unpack/interleave instruction 160, a packed shift instruction 165, an XOR instruction 170, and a packed add instruction 175. Alternative embodiments of the invention may contain more or less, as well as different, packed data instructions and still utilize the teachings of the invention. Of course, the processor 105 contains additional circuitry, which is not necessary to understanding the invention. The term data processing system is used herein to refer to any machine for processing data, including the computer system (s) described with reference to FIG. 1.

While these packed data instructions can be implemented to perform any number of different operations, in one embodiment these packed data instructions are those described in "A Set of Instructions for Operating on Packed Data," filed on Aug. 31, 1995, Ser. No. 08/521,360. Furthermore, in one embodiment, the processor 105 is a pipelined processor (e.g., the Pentium processor) capable of completing one or more of these packed data instructions per clock cycle (ignoring any data dependencies and pipeline freezes). In addition to the packed data instructions, processor 105 can include new instructions and/or instructions similar to or the same as those found in existing general purpose processors. For example, in one embodiment the processor 105 supports an instruction set which is compatible with the Intel Architecture instruction set used by existing processors, such as the Pentium processor. Alternative embodiments of the invention may contain more or less, as well as different, packed data instructions and still utilize the teachings of the invention.

The registers 142 represent a storage area on processor 105 for storing information, including control/status information, integer data, floating point data, and packed data. It is understood that one aspect of the invention is the described instruction set for operating on packed data. According to this aspect of the invention, the storage area used for storing the packed data is not critical.

In one embodiment, the processor 105 includes two pipelines, referred to herein as the U- and V-pipelines. Both the U- and the V-pipelines are capable of executing certain of the packed data instructions. In one embodiment, the U-pipeline executes the packed data instructions that require accesses to memory or register files other than those used to perform the packed data operations (e.g., MOVQ). A further description of this pipeline can be found in "A Method and Apparatus for Providing Memory Access in a Processor Pipeline", Ser. No. 08/575,780, filed Dec. 20, 1995, by Orenstein et al. To maximize throughput of the computation flow of an absolute difference of unsigned value routine, the instruction sequence may be scheduled properly to minimize data dependencies. A data dependency existing when the result of a first instruction is a source operand of a second instruction. Since there is a data dependency between the first and second instruction, execution of the second instruction cannot complete until the result of the first instruction is available. In one embodiment, such data dependencies can result in freezing the execution of the second instruction until the result of the first instruction is available.

To avoid freezing the pipeline as a result of data dependencies associated with this latency, the technique of "software pipelining" may be applied. According to this technique, in the present example, instructions that do not depend on the first instruction are inserted between the first and second instructions. As a result, by the time the processor reaches the second instruction, execution of the first instruction has completed and its result is available.

Figure 2:
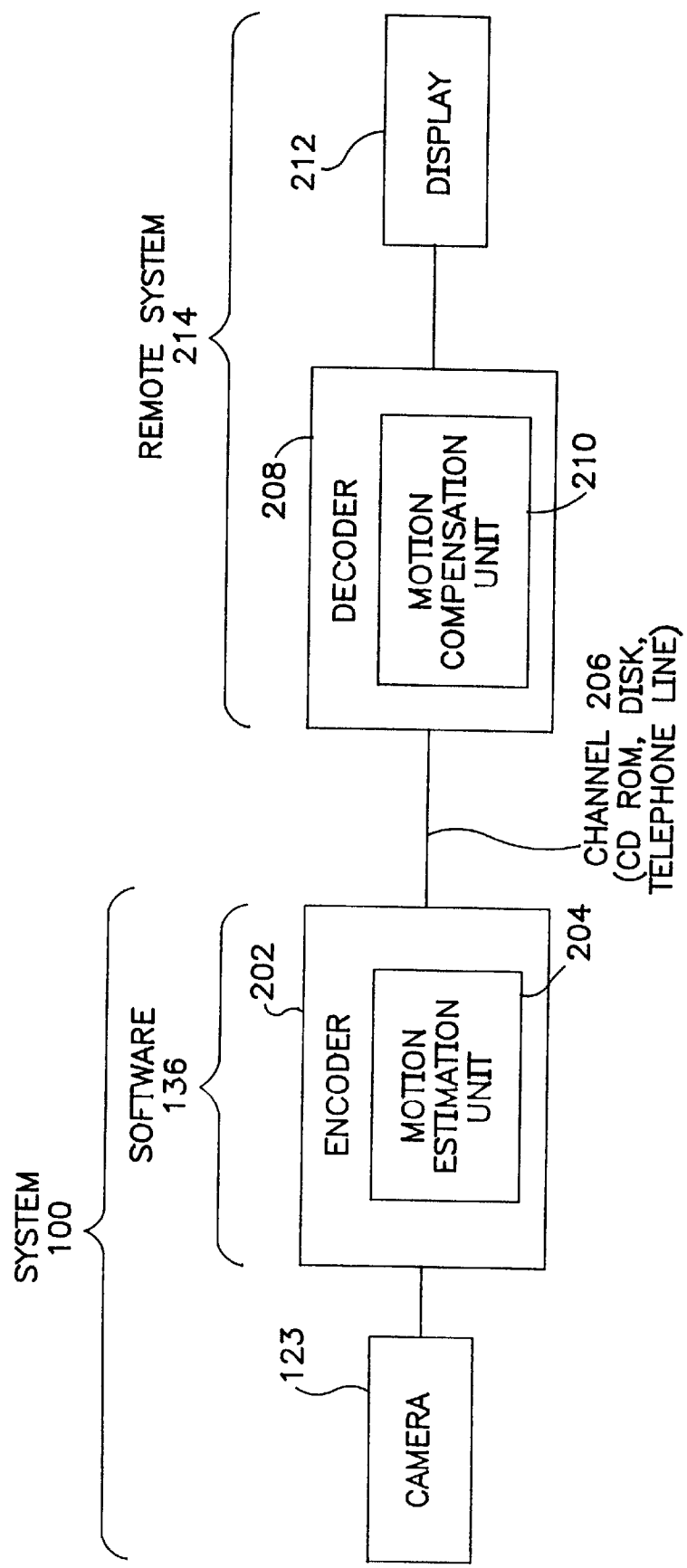
FIG. 2 is a block diagram of a motion estimation unit as it relates to the computer system illustrated in FIG. 1.

FIG. 2 is a block diagram of a motion estimation unit with an exemplary implementation of the present invention as it relates to the computer system illustrated in FIG. 1. Camera 123 of computer system 100 captures external images for display at remote computer system 214's display device 212. The captured image is transmitted to encoder 202 of computer system 100 for processing. Encoder 202 is part of software 136 illustrated in FIG. 1. In one embodiment of the present invention, an H.261 video conferencing standard may be used to process video data. With this standard, a given reference frame which is the image captured by camera 123 is altered using the information on the differences between the reference frame and a current frame. The current frame as used herein refers to the image currently being displayed by remote display device 212. The altered reference frame results in a new current frame to be displayed on remote display device 212. Motion estimation unit 204 of encoder 202 estimates the displacement of moving objects in a video sequence of the transmitted data (the reference frame) and the current frame on remote display device 212. The encoded information is then transmitted to remote computer system 214's decoder 208 through some type of transmission channel (e.g. CD ROM, disk, and telephone line). Motion compensation unit 210 of decoder 208 then outputs a new current frame for display on display device 212.

Figure 3:
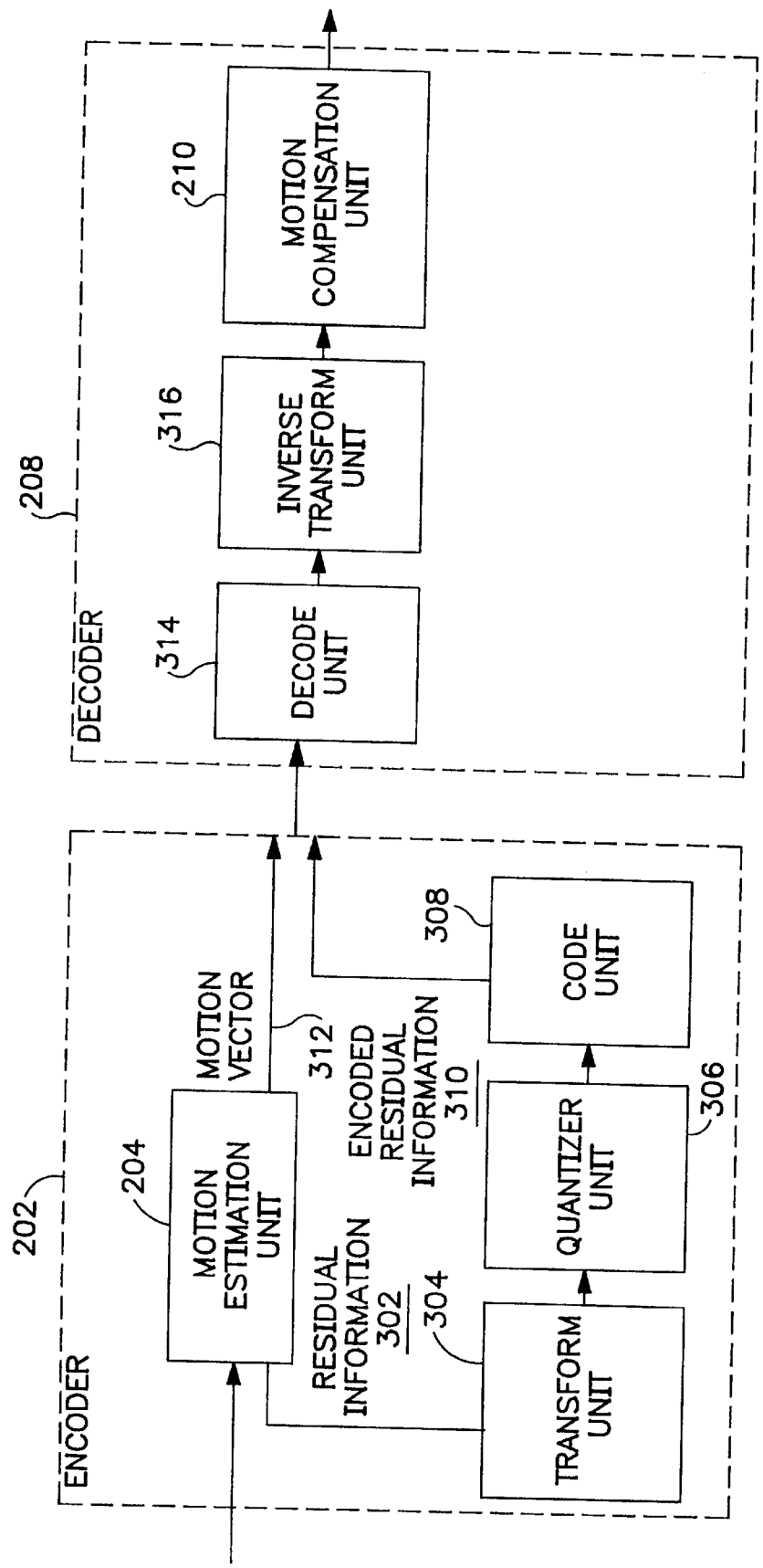
FIG. 3 is a block diagram illustrating an exemplary motion estimation unit with an exemplary implementation of the present invention used in calculating the absolute differences of unsigned packed data.

FIG. 3 is a block diagram illustrating an exemplary implementation of a motion estimation unit for calculating absolute differences of unsigned data. Motion estimation unit 202 performs motion estimation in video algorithms for encoding video streams. Motion compensation unit 210 decodes the motion vector produced by the motion estimation process of motion estimation unit 202 and reconstructs the original video streams.

Figure 4:
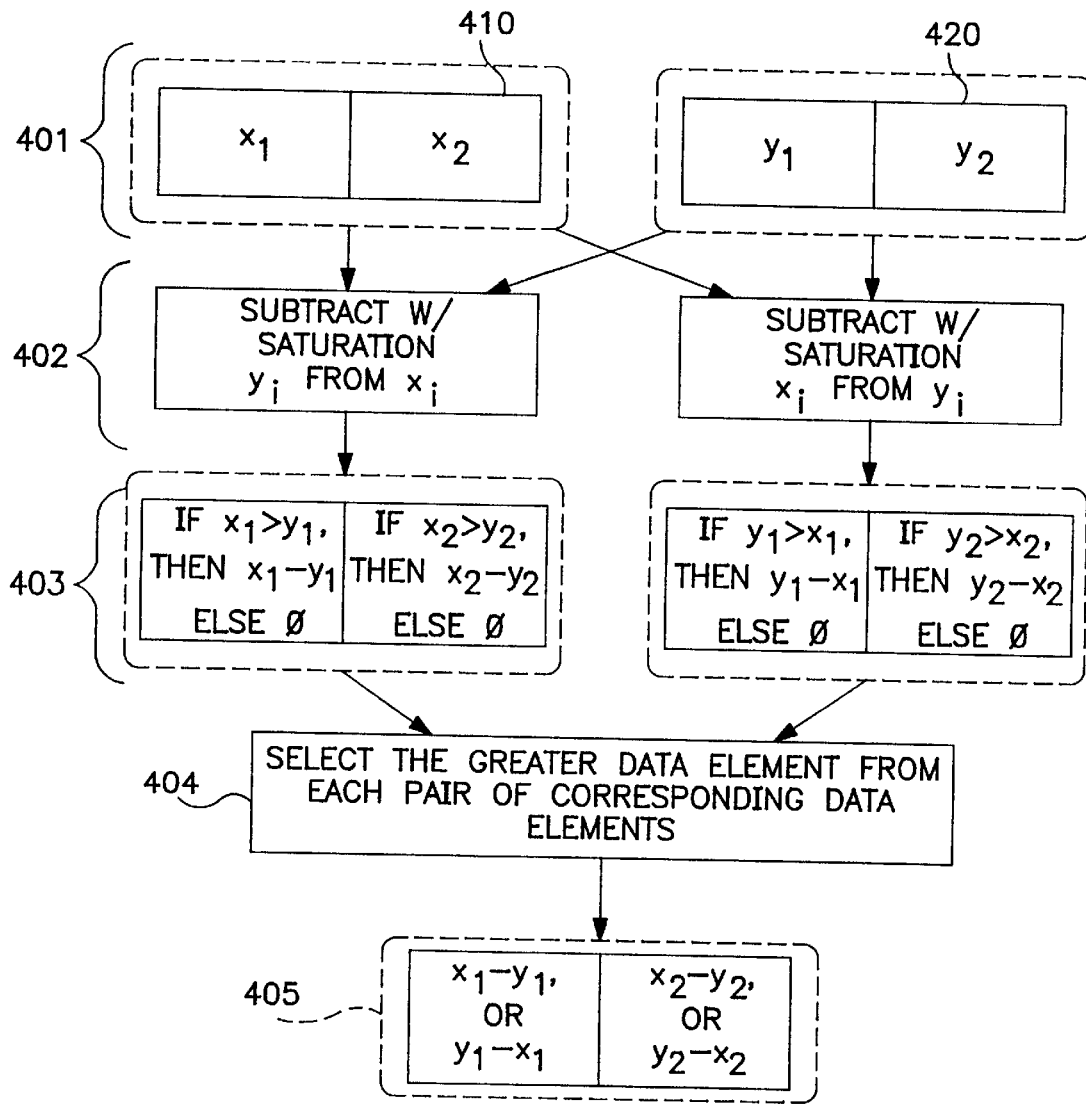
FIG. 4 is a flow diagram illustrating the general steps followed in performing an absolute differences calculation on unsigned data according to one embodiment of the invention.
Figure 5:
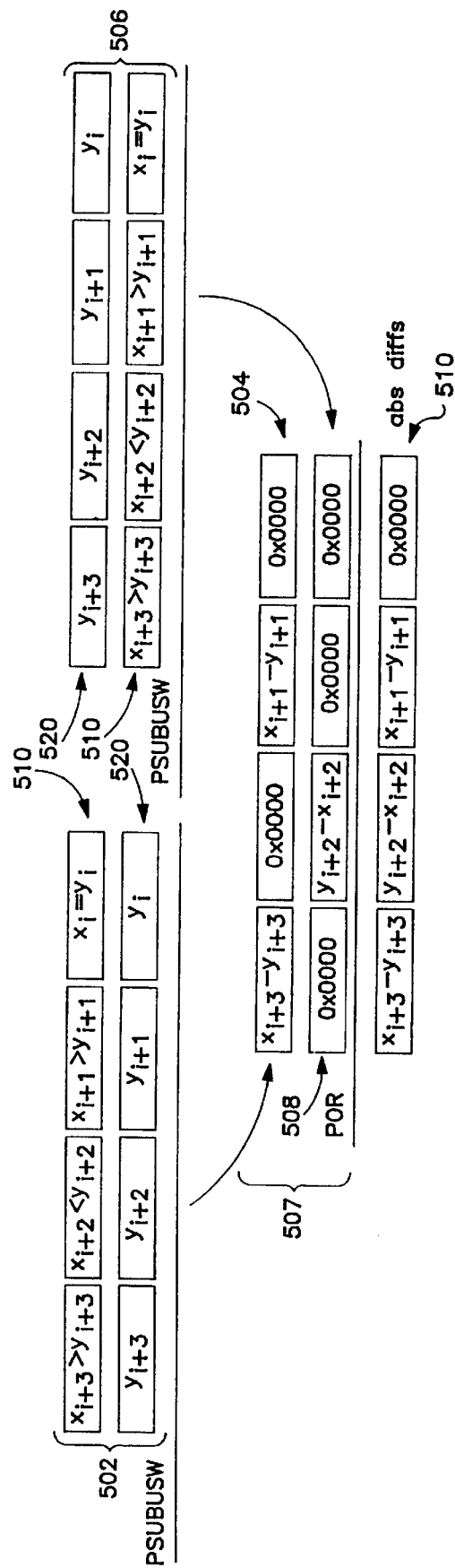
FIG. 5 illustrates the operation of an absolute differences calculation on unsigned data according to one embodiment of the invention.

In FIG. 3, encoder 202 receives video stream input which is processed by motion estimation unit 204. Motion estimation unit 204 estimates the displacement of moving objects in a video sequence, by for example, examining blocks of pixels (e.g. 16×16 or 8×8) from the current frame and comparing the data block form the current frame to a data block of a reference frame for matching data sets. Energy differences is used as a metric for finding the best matches between the data sets and the sum of absolute differences is used for the energy difference calculations by motion estimation unit 204. More specifically, motion estimation unit 204 with the implementation of the present invention performs an absolute difference calculation on unsigned packed data. The details of such a method is illustrated in FIGS. 4 and 5 and the accompanying text.

Motion estimation unit 204 produces residual information 302 and motion vector 312. Transform unit 304 receives the residual information 312. Residual information 312 are pixel differences between a block of the current frame and a matching block of a reference frame. When the search for matching data sets is performed by motion estimation unit 204, an absolute difference calculation is performed on unsigned packed data. The residual information produced is signed.

Transform unit 304 compresses the energy information in residual information 204. Transform unit 304 may be implemented with discreet cosign transform (DCT) for MPEG standard or H.261 video conferencing standard. In the alternative, transform unit 304 may be implemented with wavelet transformation, for example, the Intel Internal Indio algorithms. Quantizer unit 306 performs the process of converting the continuous valued signal of the transformed residual information into a discrete valued signal. Code unit 308 takes the quantized residual information from quantizer unit 306 and encodes the residual information through for example the Huffman code. Motion estimation unit 204 also outputs motion vector 312 having X and Y axis values corresponding to the location of the block of reference frame selected as matching the given block of the current frame.

More specifically, given a current frame and a reference frame of blocks 16×16 or 8×8 pixels, the correct motion vector for a given block is searched in the given reference frames. The number of matches searched is dependent on the algorithm used. Motion estimation unit 204 performs these searches and looks for the minimal sum of the absolute differences. Whatever block or match it finds through its pattern of searches, i.e. blocks in the reference frame which is the most similar to the current block being searched, then one is subtracted from the other. The residue then is the pixel values which are different between the block of the current frame and the block of the reference frame. If everything in the respective blocks are the same, then the residual information is zero. The subtraction yielding all residual values is then processed by transform unit 304, quantizer unit 306 and code unit 308 respectively. Motion compensation unit 210 of decoder 208 receives this residual information 302 and motion vector 312.

On the motion compensation side (decoder 208), the encoded stream is unencoded by decoder unit 314 and then untransformed by inverse transform unit 316. Motion compensation unit 210 then processes residual information 302 and motion vector 312 to produce a new current frame. Residual information 302 and motion vector 312 are used to select the block to be decoded. 8 bit values of the reference frame are unpacked into 16 bit values. The block of reference frame is altered according to the residual information which is added. Once the residual information is added to the block of reference frame the 16 bit values of the block is packed back into 8 bit values. A pack operation with unsigned saturation may be used to perform this packing operation. This creates a new current block.

FIG. 4 illustrates a technique for performing an absolute difference calculation on two complex numbers according to one embodiment of the invention. In one exemplary application of the invention, the technique described herein is implemented in the motion estimation unit described in FIGS. 2 and 3. More specifically, the technique is utilized when the motion estimation unit is performing a search of matching data sets between a block of a given current frame and a block of a given reference frame. In this application, data is represented by dotted rectangles, while instructions are represented by rectangles.

At step 401, a complex number A and a complex number B are stored in a first packed data item 410 and a second packed data item 420. The first packed data item 410 stores data elements representing the complex number A in a first format (such that the data elements are $X_1$ and $X_2$), while the second packed data item 420 stores data elements representing the complex number B in a second format (such that the data elements are $Y_1$ and $Y_2$).

At step 402, subtraction is performed using saturation arithmetic by subtracting $Y_i$ from $X_i$ and by subtracting $X_i$ from $Y_i$. At step 403, data element $X_1$ is replaced by $Y_1$ subtracted from $X_1$ if $X_1$ is greater than $Y_1$. Otherwise, $X_1$ is replaced by zero. $X_2$ is replaced by $Y_2$ subtracted from $X_2$ if $X_2$ is greater than $Y_2$. Otherwise, $X_2$ is replaced by zeros. $Y_1$ is replaced by $X_1$ subtracted from Y1 if $Y_1$ is greater than $X_1$. Otherwise $Y_1$ is set to zeros. Finally, $Y_2$ is set to $Y_2$ less $X_2$ if $Y_2$ is greater than $X_2$. Otherwise, $Y_2$ is set to all zeros. At step 404, the greater data element from each pair of corresponding data elements are selected. At step 405, depending on the results from step 404, the most significant bits are equal to $X_1-Y_1$ or $Y_1-X_1$. The least significant bits are equal to $X_2-Y_2$ or $Y_2-X_2$. In this way, the absolute differences of the unsigned values are calculated.

FIG. 5 illustrates one embodiment of how an absolute difference calculation is performed for unsigned packed data. The term operand is interchangeably used herein to refer to the data on which an instruction operates or the storage area (e.g., register, memory location, etc.) in which that data can be found. The first operand 510 is packed data item containing $X_{i+3}$, $X_{i+2}$, $X_{i+1}$, and $X_i$ as its data elements, while the second operand 520 is packed data item containing $Y_{i+3}$, $Y_{i+2}$, $Y_{i+1}$, and $Y_i$ as it data elements.

Differences are taken, for instance, between blocks of pixels and the sum of these differences absolute values is computed. Since color components are often eight bit unsigned quantities, their absolute differences can also be expressed in eight bits. In FIG. 5, four absolute differences between sixteen bit unsigned values are computed in parallel. The same method could also be used to simultaneously calculate eight absolute differences between eight bit unsigned values (pixel components which are usually represented by eight bits for example).

When packed subtractions are performed with unsigned saturating arithmetic 502 and 506, any negative results are saturated to zero (0x0000). By subtracting the values $X_i$ and $Y_i$ in both directions with this type of saturation, only positive results are generated. The results always fit into the same amount of bits as the original operands. If saturating subtract was not used, then if $X_i$ is greater than $Y_i$ and $X_i$ is subtracted from $Y_i$, a negative result is produced that needs one more bit beyond the original bits. Saturation ensures that the result is a zero and not a negative result that needs more bits than are available. Thus the usage of saturating subtract enables full parallelism without having to have to unpack the results to a higher precision data type in order to accommodate the possibility of the result being negative. The results can be combined using the logical operation performed by packed or (POR) operation 507 to produce the desired vector of absolute differences 510. While the packed data instructions can be implemented to perform any number of different operations, in one embodiment these packed data instructions are those described in "A Set of Instructions for Operating on Packed Data," filed on Aug. 31, 1995, Ser. No. 08/521,360.

Figure 6:
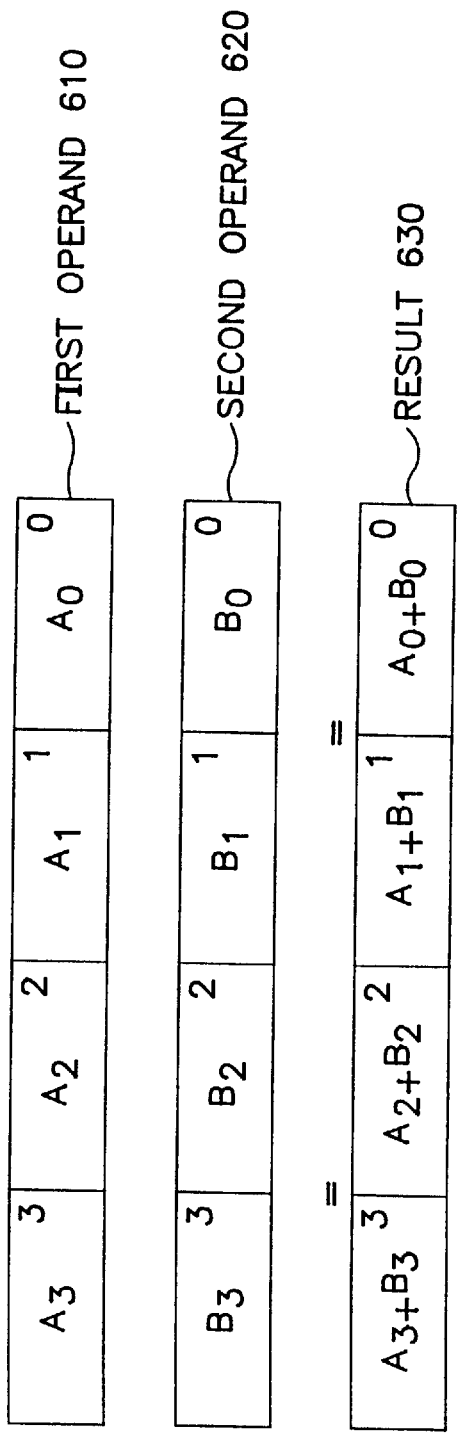
FIG. 6 illustrates a packed add operation which can be used in one embodiment of the present invention in calculating the absolute difference of unsigned data.

FIG. 6 illustrates a packed add operation according to one embodiment of the invention. The illustrated packed add operation may be used as an alternative to the packed or (POR) operation illustrated in FIG. 5. The data elements of a first operand 610 are added to the respective packed data elements of a second operand 620 to generate a result 630. For example, data element 0 of the first operand 610 is added to data element 0 the second operand 620 and the result is stored as data element 0 of the result 630. The packed add operation replacing packed or operation (POR) 507 illustrated in FIG. 5 produces the same results.

Figure 7A:
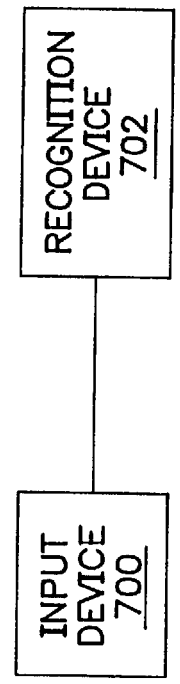
FIGS. 7a and 7b illustrate an alternate application of the present invention's system of determining the absolute difference of unsigned values.
Figure 7B:
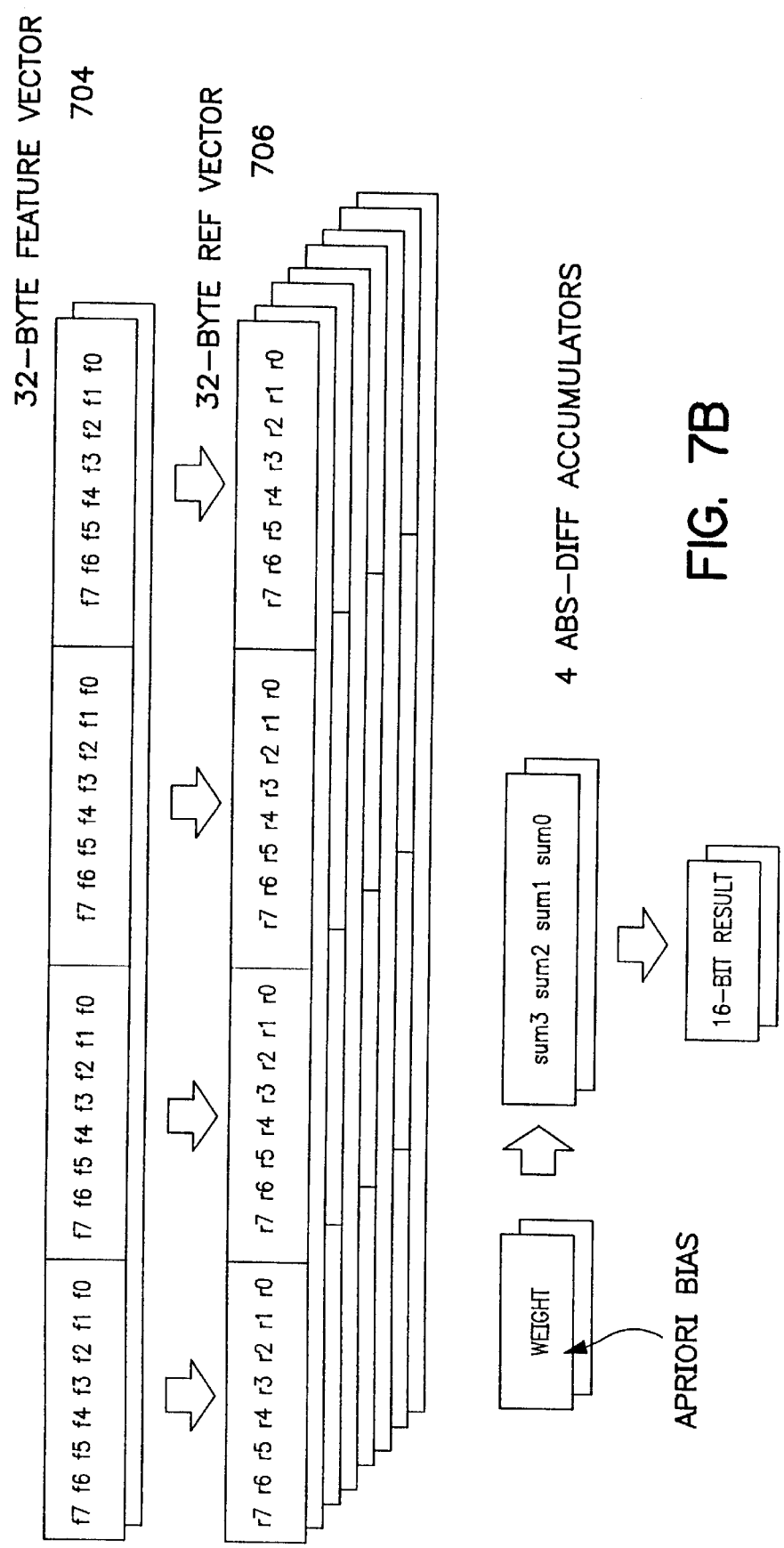

FIGS. 7a and 7b illustrate an alternate application of the present invention's system of determining the absolute difference of unsigned values. More specifically, the absolute difference of unsigned values can also be used in different recognition systems such as speech and handwriting recognition systems, particularly for matching a given data set with another as performed in motion estimation using the present invention. In FIG. 7a, input device 700 receiving input of, for example, speech and hand writing samples, generates appropriate signal. The signal is processed and feature vectors are generated. These feature vectors are then compared to pre-computed reference vectors for matches by recognition device 702. For example, given a feature vector processed from audio retrieved through a speech input device such as a microphone, a reference vector which is pre-computed in a recognition device is compared to the feature vector for matches. In FIG. 7b, the present invention's system of providing the absolute difference of unsigned values is performed on eight 8-bit data sets of a 32-byte feature vector 704 with eight 8-bit data sets of a 32-byte reference vector 706 in parallel. Each bit represents a parameter in the feature vector or the reference vector. The present invention is therefore applicable in determining the accumulated difference in energy between a feature vector and a reference vector in recognition systems.

Example code for an absolute difference of unsigned values routine that is software pipelined for the embodiment described in FIGS. 1 through 6 is included at the end of this description. The registers used for performing the packed data operations are referred to herein as mm0–mm7. The code also includes references to registers ebx, edi, and esi and instructions MOV, JNZ, and SUB (further description of these items may be found in *Pentium Processor's Users Manual—Volume 3: Architecture and Programming Manual*, 1994, available from Intel Corporation of Santa Clara, Calif.). While this code is written for one embodiment of the processor, alternative embodiments that have different instruction names or different instructions are still within the scope of the invention.

In one embodiment of the code, a sufficient number of multiply-accumulate iterations may be unrolled to minimize the overhead of loop code if necessary. Then, for the duration of each PMADDwd operation stage, instructions related to the previous and next PMADDwd operation stage are issued that do not depend of the current PMADDwd operation stage result. As a result of this software pipelining technique, a two clock throughput per complex multiply-accumulate operation can be achieved within the inner loop.

As previously described, one embodiment of processor 105 includes two pipelines (the U- and V-pipelines). Both the U- and the V-pipelines are capable executing certain of the packed data instructions. However, in one embodiment, only the U-pipeline is capable of executing packed data instructions that require accesses to memory or register files other than those used to perform the packed data operations (e.g., MOVQ). To maximize throughput of the computation flow, the instruction sequence may be scheduled properly to minimize data dependencies. To establish a framework for how the instructions may be scheduled, it is useful to first breakdown the number and type of operations that are required per iteration. Thus, similar software pipelining techniques may be used as described with reference to the motion estimation.

Example code for a complex absolute difference of unsigned values routine that is software pipelined for the described embodiment is included at the end of this description. The pairing in the pipes of the P55C is designated by the pairs of instructions in the code. Expected cycle count is in the comments. The illustrated code takes 16 values from source 1 and 16 values from source 2, each value 8 bit unsigned and generates the absolute difference of each pair of respective values. In the pairs illustrated, the first instruction goes in the first pipe and the second in the second pipe.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

EXAMPLE CODE

```
movq       mm0, (% ebp)     / 4-  get 8 pixels
movq       mm1, (% edx)     / 1-  get 8 pixels
movq       mm0, mm2         /     copy one input
movq       mm3, 8 (% ebp)   / 4-  get next 8 pixels
psubusb    mm1, mm0               get diff one way
psubusb    mm2, mm1         / 1-  get diff other way
movq       mm4, 8 (% edx)         get next 8 pixels
por        mm1, mm0         / 1-  make absolute diff
movq       mm3, mm5               copy one input
movq       mm0, mm1         / 1-  copy
psubusb    mm4, mm3               get diff one way
punpckbw   mm6, mm0         / 1-  unpack with zero reg
psubusb    mm5, mm4               get diff other way
psrlq      $32, mm1         / 1-  shift for upper pixels
por        mm4, mm3         /     make absolute diff
punpckbw   mm6, mm1         / 1-  unpack upper pixels
movq       mm3, mm4               copy
punpckbw   mm6, mm3         / 1-  unpack with zero reg
paddw      mm0, mm7               add 4 lower
psrlq      $32, mm4         / 1-  shift for upper pixels
paddw      mm1, mm7               add 4 upper
punpckbw   mm6, mm4         / 1-  unpack upper pixels
paddw      mm3, mm7               add 4 lower
paddw      mm4, mm7         / 1-  add 4 upper
```

What is claimed is:

1. A method of determining the absolute difference for pattern matching when processing audio, video, or other output, said method comprising the steps of:
   subtracting in parallel and with saturation data elements in a first packed data from corresponding data elements in a second packed data to generate a third packed data by a processor in response to a first instruction, said data elements being unsigned values using in said pattern matching;
   subtracting in parallel and with saturation said data elements in second packed data from said corresponding data elements in said first packed data to generate a fourth packed data by said processor in response to a second instruction; and
   performing an operation that results in the greater of each of the corresponding data elements in said third and fourth packed data being stored in a fifth packed data in response to a third instruction.

2. The method of claim 1, wherein:
   said first packed data, said second packed data, said third packed data, said fourth packed data, and said fifth packed data each include four data elements.

3. The method of claim 1, wherein each of said data elements is represented in a first number of bits.

4. The method of claim 3, wherein:
   said first number of bits is one of eight, sixteen, and thirty-two.

5. The method of claim 1, wherein said operation is one of an OR operation and an add operation.

6. A machine-readable medium having stored thereon data representing sequences of instructions, said sequences of instructions which, when executed by a processor, cause said processor to perform the steps of:
   subtracting with saturation corresponding data elements in a first packed data from said corresponding data elements in a second packed data to generate a third packed data in response to a first instruction, said data elements representing unsigned values;
   subtracting with saturation said data elements in said second packed data from said corresponding data elements in said first packed data to generate a fourth packed data in response to a second instruction; and
   performing an operation that results in the greater of each of the corresponding data elements in said third and fourth packed data being stored in a fifth packed data in response to a third instruction.

7. The machine-readable medium of claim 6, wherein:
   said first packed data, said second packed data, said third packed data, said fourth packed data, and said fifth packed data each include four data elements.

8. The machine-readable medium of claim 6, wherein each of said data elements is represented in a first number of bits.

9. The machine-readable medium of claim 8, wherein:
   said first number of bits is one of eight, sixteen, and thirty-two.

10. The machine-readable medium of claim 6, wherein said operation is one of an OR operation and an add operation.

11. A computer system comprising:
   a device which generates an audio or video signal;
   a processor coupled to the device;
   a storage device coupled to the processor and having stored therein a first packed data and a second packed data having corresponding data elements, said data elements representing unsigned values, and at least some of the data elements representing said audio or video signal, an absolute difference routine for determining the absolute difference of said corresponding data elements, the absolute difference routine, when executed by the processor, causes the processor to:
      subtract with saturation said data elements in said first packed data from said corresponding data elements in said second packed data to generate a third packed data in response to a first single instruction;

subtract with saturation said data elements in said second packed data from said corresponding data elements in said first packed data to generate a fourth packed data in response to a second single instruction; and perform an operation that stores the greater of each of the corresponding data elements in said third and fourth packed data in a fifth packed data in response to a third single instruction.

12. The system of claim 11, wherein: said first packed data, said second packed data, said third packed data, said fourth packed data, and said fifth packed data each include four data elements.

13. The system of claim 11, wherein each of said data elements is represented in a first number of bits.

14. The system of claim 13, wherein:
said first number of bits is one of eight, sixteen, and thirty-two.

15. The system of claim 11, wherein said operation is one of an OR operation and an add operation.

* * * * *